United States Patent
Young et al.

(10) Patent No.: US 9,896,610 B2
(45) Date of Patent: Feb. 20, 2018

(54) METHODS AND AQUEOUS BASED WELLBORE FLUIDS FOR REDUCING WELLBORE FLUID LOSS AND FILTRATE LOSS

(75) Inventors: Steven Young, Cypress, TX (US); Emanuel Stamatakis, Houston, TX (US)

(73) Assignee: M-I L.L.C., Houston, TX (US)

( * ) Notice: Subject to any disclaimer, the term of this patent is extended or adjusted under 35 U.S.C. 154(b) by 1075 days.

(21) Appl. No.: 12/991,015

(22) PCT Filed: May 4, 2009

(86) PCT No.: PCT/US2009/042715
§ 371 (c)(1),
(2), (4) Date: Nov. 4, 2010

(87) PCT Pub. No.: WO2009/137407
PCT Pub. Date: Nov. 12, 2009

(65) Prior Publication Data
US 2011/0056752 A1    Mar. 10, 2011

Related U.S. Application Data

(60) Provisional application No. 61/050,525, filed on May 5, 2008, provisional application No. 61/077,967, filed on Jul. 3, 2008.

(51) Int. Cl.
| C09K 8/08 | (2006.01) |
| C09K 8/12 | (2006.01) |
| C09K 8/508 | (2006.01) |
| C09K 8/575 | (2006.01) |

(52) U.S. Cl.
CPC ............. *C09K 8/08* (2013.01); *C09K 8/12* (2013.01); *C09K 8/508* (2013.01); *C09K 8/5751* (2013.01)

(58) Field of Classification Search
None
See application file for complete search history.

(56) References Cited

U.S. PATENT DOCUMENTS

| 4,664,816 | A | | 5/1987 | Walker |
| 4,676,317 | A | * | 6/1987 | Fry et al. ................... 166/293 |
| 4,690,996 | A | * | 9/1987 | Shih et al. ................. 527/312 |
| 4,703,801 | A | * | 11/1987 | Fry et al. .................. 166/293 |
| 4,938,803 | A | * | 7/1990 | Huddleston et al. ........ 106/719 |
| 4,982,793 | A | * | 1/1991 | Holtmyer et al. ........ 166/305.1 |
| 5,003,022 | A | | 3/1991 | Nguyen et al. |
| 5,032,296 | A | * | 7/1991 | Patel ........................ 507/206 |
| 5,067,565 | A | * | 11/1991 | Holtmyer et al. ........ 166/305.1 |
| 5,147,964 | A | * | 9/1992 | Huddleston et al. ....... 527/400 |
| 5,304,620 | A | * | 4/1994 | Holtmyer et al. .......... 527/310 |
| 5,711,383 | A | * | 1/1998 | Terry et al. ................. 175/72 |
| 5,789,349 | A | * | 8/1998 | Patel ........................ 507/121 |
| 6,165,947 | A | * | 12/2000 | Chang et al. .............. 507/216 |
| 6,258,757 | B1 | | 7/2001 | Sweatman et al. |
| 6,465,587 | B1 | * | 10/2002 | Bair et al. .................. 526/240 |
| 6,703,351 | B2 | | 3/2004 | Stowe, II et al. |
| 6,715,568 | B1 | * | 4/2004 | Bailey ....................... 175/72 |
| 7,271,131 | B2 | | 9/2007 | Halliday et al. |
| 7,645,725 | B2 | * | 1/2010 | Weaver et al. ............ 507/215 |
| 2004/0173353 | A1 | * | 9/2004 | Todd ......................... 166/300 |
| 2007/0012447 | A1 | * | 1/2007 | Fang et al. ................ 166/291 |
| 2008/0017376 | A1 | * | 1/2008 | Badalamenti et al. ..... 166/292 |
| 2010/0089581 | A1 | * | 4/2010 | Nguyen et al. .......... 166/280.2 |

FOREIGN PATENT DOCUMENTS

| EP | 2025732 A1 | 2/2009 |
| EP | 2297270 A2 | 3/2011 |
| WO | 2007005499 A1 | 1/2007 |

OTHER PUBLICATIONS

International Search Report from PCT/US2009/042715 dated Dec. 16, 2009 (2 pages).
Written Opinion from PCT/JP2009/042715 dated Dec. 16, 2009 (4 pages).
Office Action issued in corresponding Australian Application No. 2009244507 dated Dec. 23, 2011 (2 pages).
Office Action issued in corresponding Eurasian Application No. 201071271 dated Apr. 20, 2012 (4 pages).
Office Action issued in corresponding Mexican Application No. MX/a/2010/012058 dated Apr. 23, 2012 (5 pages).
Office Action issued in corresponding Egyptian Application No. PCT2010111870 dated Apr. 26, 2012 (6 pages).
Office Action issued in corresponding European Application No. 09743393.2 dated Jun. 4, 2012 (7 pages).
Office Action issued in corresponding Australian Application No. 2009244507 dated Sep. 2, 2011 (1 page).
Search Report issued in corresopnding European Application No. 09743393.2 dated Sep. 28, 2011 (7 pages).
Patent Examination Report issued in corresponding Australian Application No. 2012203468 dated Jan. 7, 2013 (3 pages).
Official Action, with English Translation, issued in corresponding Eurasian Application No. 201071271 dated Dec. 24, 2012 (4 pages).
Office Action issued in corresponding China Application No. 200980121665, with English translation, dated Dec. 12, 2012 (12 pages).
Official Action (with English translation) dated Aug. 21, 2013, received in corresponding Eurasian application No. 201071271 (6 pages).

(Continued)

*Primary Examiner* — Anuradha Ahuja
(74) *Attorney, Agent, or Firm* — Osha Liang LLP

(57) ABSTRACT

Embodiments disclosed herein relate to aqueous based wellbore fluids for preventing wellbore fluid loss downhole containing at least one copolymer formed from at least one natural polymer monomer and at least one latex monomer, and an aqueous base fluid.

11 Claims, No Drawings

(56) References Cited

OTHER PUBLICATIONS

Office Action issued in corresponding Eurasian Application No. 201071271, dated Apr. 23, 2014 (4 pages).
English translation of Examination Report issued in corresponding Vietnamese Application No. 1-2010-03211, dated Mar. 25, 2014 (1 page).
Office Action in corresponding European Application No. 09743393.2, dated Mar. 10, 2014 (8 pages).
Office Action issued in European Patent Application No. 09743393.2; dated Nov. 16, 2015 (8 pages).
Examination Report issued under Canadian Application No. 2,723,591 dated Mar. 6, 2012, 3 pages.

\* cited by examiner

METHODS AND AQUEOUS BASED WELLBORE FLUIDS FOR REDUCING WELLBORE FLUID LOSS AND FILTRATE LOSS

BACKGROUND OF INVENTION

Field of the Invention

Embodiments disclosed herein relate generally to methods and fluids for reducing wellbore fluid loss during drilling. Even more particularly, embodiments disclosed herein relate to aqueous based wellbore fluids that contain copolymers of at least one natural polymer and at least one latex.

Background Art

During the drilling of a wellbore, various fluids are typically used in the well for a variety of functions. The fluids may be circulated through a drill pipe and drill bit into the wellbore, and then may subsequently flow upward through wellbore to the surface. During this circulation, the drilling fluid may act to remove drill cuttings from the bottom of the hole to the surface, to suspend cuttings and weighting material when circulation is interrupted, to control subsurface pressures, to maintain the integrity of the wellbore until the well section is cased and cemented, to isolate the fluids from the formation by providing sufficient hydrostatic pressure to prevent the ingress of formation fluids into the wellbore, to cool and lubricate the drill string and bit, and/or to maximize penetration rate.

As stated above, wellbore fluids are circulated downhole to remove rock as well as deliver agents to combat the variety of issues described above. Fluid compositions may be water- or oil-based and may comprise weighting agents, surfactants, proppants, and polymers. However, for a wellbore fluid to perform all of its functions and allow wellbore operations to continue, the fluid must stay in the borehole. Frequently, undesirable formation conditions are encountered in which substantial amounts or, in some cases, practically all of the wellbore fluid may be lost to the formation. For example, wellbore fluid can leave the borehole through large or small fissures or fractures in the formation or through a highly porous rock matrix surrounding the borehole. Thus, fluid loss or lost circulation is a recurring drilling problem, characterized by loss of wellbore fluids into downhole formations that are fractured, highly permeable, porous, cavernous, or vugular.

A particular problem when drilling into shale formations with water-based fluids is the pore pressure increase and swelling from penetration of the shale by the fluid. Shale stabilizers are typically added to the mud to inhibit these phenomena and to stabilize the shale from being affected by the mud.

Reducing drilling fluid pressure invasion into the wall of a borehole is one of the most important factors in maintaining wellbore stability. It is recognized that sufficient borehole pressure will stabilize shales to maintain the integrity of the borehole. When mud or liquid invades the shale, the pressure in the pores rises and the pressure differential between the mud column and the shale falls. With the drop in differential pressure, the shale is no longer supported and can easily break off and fall into the well bore. Likewise, the invasion of water into the shale matrix increases hydration or wetting of the partially dehydrated shale body causing it to soften and to lose its structural strength. Chemical reactivity can also lead to instability. There is always a need for a better composition and method to stabilize the shale formations.

There is an analogous need to seal and prevent fluid loss when recovering hydrocarbons from sand formations, particularly depleted sand formations. Depleted sand formations are productive, or formerly productive, hydrocarbon zones that have been produced, drawn down, or otherwise depleted of their content, creating a lower formation pressure than that of the fluid which may be in use in the well. Because of this pressure differential, it is important to partially or completely seal the sand formation to inhibit or prevent fluid loss of the mud into the sand.

In attempting to cure these and other problems, crosslinkable or absorbing polymers, loss control material (LCM) pills, and cement squeezes have been employed. These additives have found utility in preventing mud loss, stabilizing and strengthening the wellbore, and zone isolation and water shutoff treatments. Some typical viscosifying additives used in well fluids to combat fluid loss include natural polymers and derivatives thereof such as xanthan gum and hydroxyethyl cellulose (HEC). In addition, a wide variety of polysaccharides and polysaccharide derivatives may be used, as is known in the art.

Further, providing effective fluid loss control without damaging formation permeability in completion operations has been a prime requirement for an ideal fluid loss-control pill. Conventional fluid loss control pills include a variety of polymers or resins, calcium carbonate, and graded salt fluid loss additives, which have been used with varying degrees of fluid loss control. These pills achieve their fluid loss control from the presence of specific solids that rely on filtercake build up on the face of the formation to inhibit flow into and through the formation. However, these additive materials can cause severe damage to near-wellbore areas after their application. This damage can significantly reduce production levels if the formation permeability is not restored to its original level. Further, at a suitable point in the completion operation, the filter cake must be removed to restore the formation's permeability, preferably to its original level.

Induced mud losses may also occur when the mud weight, required for well control and to maintain a stable wellbore, exceeds the fracture resistance of the formations. A particularly challenging situation arises in depleted reservoirs, in which the drop in pore pressure weakens hydrocarbon-bearing rocks, but neighboring or inter-bedded low permeability rocks, such as shales, maintain their pore pressure. This can make the drilling of certain depleted zones impossible because the mud weight required to support the shale exceeds the fracture resistance of the sands and silts.

While various natural and synthetic polymers are commonly added to wellbore fluids to control fluid loss from the fluids into subterranean formations, some wellbores into which the water-based fluids are pumped have relatively high downhole temperatures and/or pressures at which traditional fluid loss control agents are unstable. As such, those fluid loss control agents may fail to serve their purpose of providing fluid loss control downhole.

Accordingly, there exists a continuing need for methods and systems for reducing fluid loss when using aqueous based wellbore fluids.

SUMMARY OF INVENTION

In one aspect, embodiments disclosed herein relate to aqueous based wellbore fluids for preventing wellbore fluid loss downhole containing at least one copolymer formed from at least one natural polymer monomer and at least one latex monomer, and an aqueous base fluid.

In another aspect, embodiments disclosed herein relate to methods for drilling a wellbore including introducing an aqueous based wellbore fluid into the wellbore, and circulating the aqueous based wellbore fluid while drilling, wherein the aqueous based wellbore fluid contains a copolymer of a natural polymer and a latex.

Other aspects and advantages of the invention will be apparent from the following description and the appended claims.

DETAILED DESCRIPTION

In one aspect, embodiments disclosed herein relate to aqueous based wellbore fluids for preventing wellbore fluid loss downhole including at least one copolymer, the at least one copolymer formed from at least one natural polymer monomer and at least one latex monomer and an aqueous base fluid. In another aspect, embodiments disclosed herein relate to methods for drilling a wellbore including introducing an aqueous based wellbore fluid into the wellbore and circulating the aqueous based wellbore fluid within the wellbore while drilling, wherein the aqueous based wellbore fluid includes a copolymer of a natural polymer and a latex. In yet another aspect, embodiments disclosed herein relate to methods of sealing a wellbore including introducing an aqueous based wellbore fluid into the wellbore and circulating the aqueous based wellbore fluid within the wellbore while drilling, wherein the aqueous based wellbore fluid includes a copolymer of a natural polymer and a latex.

The inventors have surprisingly discovered that copolymers of natural polymers and latexes when added to aqueous wellbore fluids may reduce wellbore fluid loss to an earthen foimation. The inventors have also surprisingly discovered that aqueous wellbore fluids including copolymers of natural polymers and latexes may provide control over filtration loss into low permeability formations such as shales and clays. The inventors have further surprisingly discovered that aqueous wellbore fluids including copolymers of natural polymers and latexes may provide filtration loss control across temperature ranges up to or greater than 400° F.

Frequently, the type of fluid loss control additive used depends on numerous factors inclusive of the type of formation to be sealed, planned depth of the well and the temperatures expected to be encountered downhole. For example, wellbore fluids, spacer fluids and flushes including natural polymers, such as gums, starch and cellulose derivatives, for the purpose of fluid loss control or for particle suspension, may become less stable at elevated temperatures. Further, wellbore fluids containing natural polymers that become less stable at elevated temperatures (some may degrade at temperatures as low as 225° F.) may not be suitable for long term performance applications or HPHT wells where downhole temperatures routinely are at the higher end of the temperature range over which these natural polymers are stable. Consistent exposure to temperatures at the higher end of this range may lead to degradation of the natural polymer components of the wellbore fluid. This degradation may in turn lead to loss of control of wellbore fluid loss or filtration loss into the formation. As such, wellbore fluids including natural polymers which are thermally unstable at higher temperatures may not be suitable for long term performance applications or HPHT wells. Rather, for temperatures greater than 225° F., synthetic polymers such as acrylamide-based, AMPS based and acrylate based polymers may instead be used to provide greater thermal stability than natural polymer, up to or greater than 400° F.

Further, while wellbore fluids including natural (or acrylamide-based synthetic) polymers are fairly effective at preventing wellbore fluid loss into high permeation formations where a filter cake can be built up against the permeable media, such wellbore fluids may not be as effective in preventing fluid loss into low permeability formations such as shales and clays where such a filter cake cannot be built up due to the relative impermeability of the formation. Wellbore fluids using natural polymers may thus still permeate and enter the pores of the low permeation formation. When fluid invades shale, the increase in pressure of the pores and the corresponding decrease in the pressure differential between the formation and the wellbore fluid column may then lead to loss of support of the formation and a resultant collapse of part of the formation into the wellbore. As such, wellbore fluids containing natural polymers may not be suitable for sealing low permeation formations such as clays and shales.

For low permeability formations, synthetic polymers such as latexes may be employed as a sealing agent. The polymer latex seal is semi-permeable, and thus to seal the formation is typically combined with a combining/precipitating agent such as a metal complex, causing precipitation of the latex on the wellbore wall which may thus reduce the rate of mud pressure penetration into shale formations. Examples of such use of latexes as sealing agents may be found in U.S. Pat. No. 6,258,757, 6,715,568, 6,703,351 and 7,271,131. However, such latex polymers generally have a thermal stability even lower than natural polymers (typically <250° F.), In addition the combination with a co-precipitating agent typically makes these latex polymers function poorly as stand alone fluid loss control additives in more permeable formations.

Wellbore fluids including copolymers of natural polymers and latexes have been found to possess unique properties not possessed by either of natural polymers or latexes. This is particularly surprising considering that this improvement in properties could not be achieved using wellbore fluids including blends of natural polymers and latexes. The inventors have found that wellbore fluids including copolymers of natural polymers and latex polymers have been found to effectively prevent wellbore fluid and filtrate loss downhole. Further, the inventors have surprisingly found that the wellbore fluids and methods of drilling of the present disclosure may allow control over wellbore fluid and filtrate loss into both high and low permeation formations, such as clays and shales. Even further, wellbore fluids and methods of drilling of the present disclosure may provide control over wellbore fluid and filtrate loss over temperatures greater than 400° F. Blends of natural polymers and latexes would not be stable at the higher end of this range, as the natural polymer component and/or latex component would degrade, causing premature degradation of the filtercake.

Natural polymers and latexes are very different polymers, both in terms of chemical structure and physical properties. The wellbore fluids of the present disclosure include copolymers of natural polymers and latexes which include at least one natural polymer monomer and at least one latex monomer. The copolymers of at least one natural polymer and at least one latex are thought to provide the wellbore fluid with increased temperature stability over a wider temperature range.

Natural Polymer Monomer

As used herein, "natural polymers" refer to any polymer produced by living organisms. Examples of natural polymers include polysaccharides, lignins, lignitic materials, and tannins. One of skill in the art would appreciate the scope of natural polymers useful in the methods and aqueous wellbore fluids disclosed herein.

Lignins and Lignitic Materials

Lignins are complex, natural, amorphous polymers related to cellulose that provide rigidity and together with cellulose form the woody cell walls of plants and the cementing material between them. Lignins are formed from the oxidative coupling of, primarily, 4-hydroxyphenylpropanoids. An example of the structure of a small piece of lignin polymer is presented below:

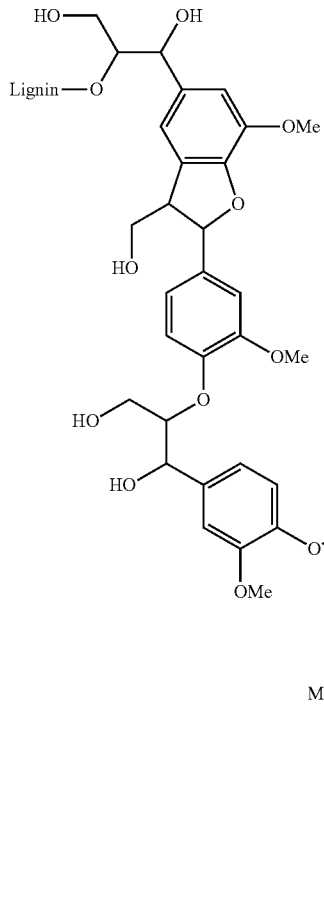
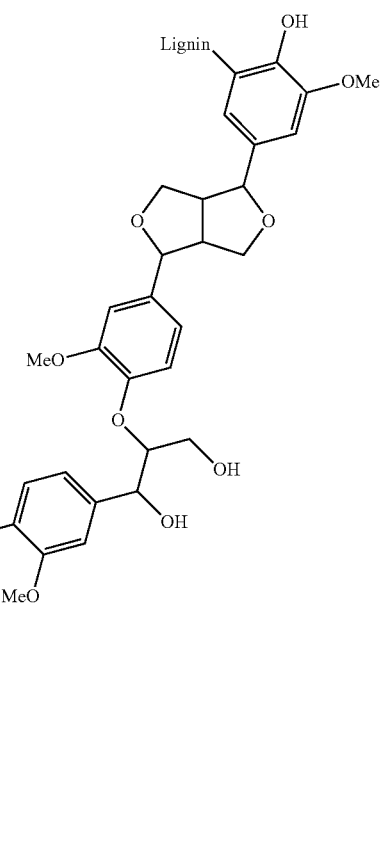

Lignin is therefore a complex polymer of phenylpropane units, which are cross-linked to each other. This complexity has thus far proven fairly resistant to microbial degradation. Some fungi have developed the necessary enzymes to break lignin apart. The initial decomposition reactions are mediated by extracellular lignin and manganese peroxidases, primarily produced by white-rot fungi. Soil bacteria such as Actinomycetes can also decompose lignin, but typically degrade less than 20 percent of the total lignin present. Lignin degradation tends to be primarily an aerobic process, and in an anaerobic environment, such as in the wellbore, lignin can persist for very long periods. Further, one skilled in the art would appreciate that such lignin materials may also include lignosulfonates, which are modified lignins.

Tannins

Tannins are naturally occurring plant polyphenols. Tannins are common in fruits such as grapes, persimmon, and blueberry, in tea, in chocolate, in legume trees such as Acacia, and Sesbania, and in grasses and grains such as sorghum and corn. Tannins may be hydrolysable or condensed. Hydrolysable tannins are composed of a polyol carbohydrate such as D-glucose partially or totally esterified with phenolic groups such as gallic acid (in gallotannins) or ellagic acid (in ellagitannins). Hydrolyzable tannins are hydrolyzed by weak acids or weak bases to produce carbohydrate and phenolic acids. The structure of a hydrolysable tannin is represented below.

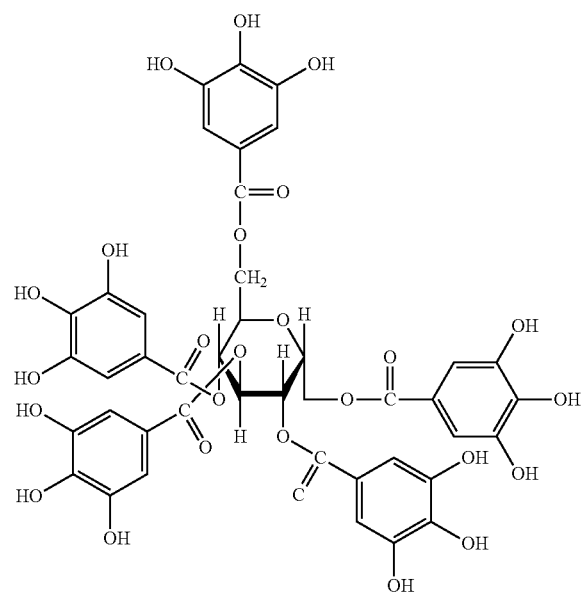

Condensed tannins, also known as proanthocyanidins, are polymers of 2 to 50 (or more) flavanoid units that are joined by carbon-carbon bonds, which are not susceptible to being hydrolysed. While hydrolysable tannins and most condensed tannins are water soluble, some very large condensed tannins are insoluble. Further, one skilled in the art would appreciate that use of tannins may also include modified tannins.

Polysaccharides

Polysaccharides are polymers of monosaccharides joined together by glycosidic linkages. They tend to be large, often branched macromolecules found in nature. Monomer units of natural polymers tend to be six-carbon monosaccharides, and the natural polymer may therefore be represented by a general formula of $(C_6H_{10}O_5)_n$ where n is usually a number between 40 and 3000. Examples of polysaccharides useful as monomers in embodiments of the present disclosure include starch, glycogen, cellulose, locust bean gums, xanthan gums, wellan gums, scleroglucan gums, and guar gums and mixtures and derivatives thereof. However, no limitation of the type of polysaccharide that may be used as a monomer is intended.

Starches are naturally occurring natural polymers found in green plant cells and some microorganisms. The starch or cellulose may be from any botanical source such as a cereal, a fruit, a root, or a tuber. Some examples of starches include potato starch, corn starch, tapioca starch, wheat starch and rice starch. Like other naturally occurring natural polymers, starches consist of only glycosidic units. The glycosidic units found in starch are amylose and amylopectin, both of which consist of alpha-D-glucose units only.

Amylose is a substantially linear, sparsely branched polymer with a molecular mass in the range of $10^5$ to $10^6$ g/mol primarily from 1-4 linked glucose units. The structure of amylose is represented as below:

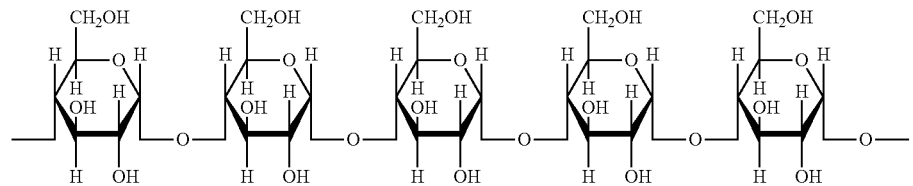

Amylopectin is a highly branched molecule with a molecular mass between $10^7$ and $10^9$ g/mol. Amylopectin also contains 1-4 linked glucose units, but in addition, 1-6 glucosidic branching points occur every 20-30 glucose units. The structure of amylopectin is represented as below:

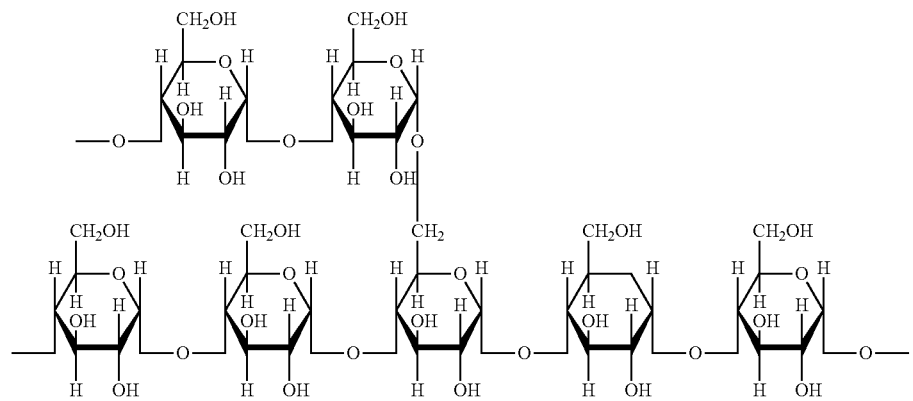

The ratio of amylose to amylopectin found in starch is typically 20:80 or 30:70. It is also possible to use a starch having an increased amylose or increased amylopectin content.

Polysaccharides tend to be hydrophilic due to the presence of —OH groups present on the monosaccharide units. The extent of the reaction of the natural polymer with water is dependent on the degree of internal hydrogen bonding and the sterical flexibility of the particular natural polymer used. Many polysaccharides, such as starches, interact with water. This interaction with water may cause swelling of the natural polymer. Where polysaccharides are used in water-based wellbore fluids, measures may have to be taken to control swelling of the polysaccharides.

Natural polymer monomer units useful in embodiments herein may be also be derivatized. "Derivatized natural polymers" refers to natural polymers that have been modified chemically. Such derivatized natural polymers may include hydroxyalkyl starches and gums, starch and gum esters, cross-linked starches and gums, hypochlorite oxidized starches and gums, starch and gum phosphate monoesters, cationic starches and gums, starch and gum xanthates, and dialdehyde starches and gums. These derivatized natural polymers may be manufactured using any means known in the art. Examples of derivatized starches include carboxymethyl starches, hydroxyethyl starches, hydroxypropyl starches, hydroxybutyl starches, carboxymethylhydroxyethyl starches, carboxymethylhydroxypropyl starches, carboxymethylhydroxybutyl starches, polyacrylamide starches, and other starch copolymers.

Latex Monomer

As used herein, "latex monomer" may refer to any synthetic or natural rubber. A variety of well known latex materials can be used as latex monomer units in embodiments of the copolymer of the present disclosure. For example, natural rubber (cis-1,4-polyisoprene) and most of its modified types may be used. Synthetic polymers of various types may also be used, including polymers or copolymers of vinyl acetate, vinyl esters of fatty acids, esters of acrylic and methacrylic acids, acrylonitrile, styrene, vinyl chloride, vinylidene chloride, tetrafluoroethylene and other mono-olefinically unsaturated monomers. Some examples of latex monomers which may be useful in embodiments of the present disclosure include styrene/butadiene, cis-1,4-polybutadiene and copolymers thereof, high styrene resin, butyl, ethylene/propylene, neoprene, nitrile, cis-1,4-polyisoprene, silicone chlorosulfonated polyethylene, epichlorohydrin, fluorocarbon, fluorosilicone, polyurethane, polyacrylic and polysulfide.

Latexes are hydrophobic in nature, and tend to form discrete particles in aqueous solution to minimize interaction with water. Surfactants may be added to improve the interaction of latexes with water.

The natural polymer/latex copolymers of the present disclosure have been found to have properties of both natural polymer and latex components. For example, the natural polymer/latex copolymers have both hydrophilic and hydrophobic sections. As such, these copolymers may be considered amphiphilic in nature, and thus may exhibit greater compatibility with water-based wellbore fluids than latexes. Also, because of the latex component, natural polymer/latex copolymers may exhibit less swelling than comparable polymers of their natural polymer components. Further, these copolymers have demonstrated heat stability at temperatures higher than comparable polymers of their natural polymer components. Wellbore fluids including the natural polymer/latex copolymers of the present disclosure may exhibit advantages over comparable wellbore fluids including either comparable polymers of their natural polymer components, or comparable polymers of their latex components.

The copolymers of natural polymers and latexes may also be of any type known in the art, for example block copolymers, random copolymers, alternating copolymers, and graft copolymers, and may be produced by any means known in the art. For example, starch graft copolymers of styrene and 1,3-butadiene can be produced according to methods such as those disclosed in U.S. Pat. No. 5,003,022, which is herein incorporated by reference in its entirety.

An example of a natural polymer/latex copolymer useful in embodiments of the present disclosure is a starch graft styrene/1,3-butadiene copolymer commercially available as Pencote®™ (Penford Products Company, Cedar Rapids, Iowa). Pencote®™ is produced from the reaction products of styrene and 1,3-butadiene and a thinned lightly oxidized hydroxyethyl starch having a solids concentration of 21% by weight and characterized by an intrinsic viscosity of about 0.23 dl/g. Another starch graft copolymer useful in embodiments herein is commercially available as Penflex™ (Penford Products Company, Cedar Rapids, Iowa). Yet another starch graft copolymer useful in embodiments herein is available commercially as Pensize®™ (Penford Products Company, Cedar Rapids, Iowa). Pensize®™ is a styrene/1,3-butadiene starch graft copolymer produced from a highly thinned oxidized hydroxyethyl starch characterized by an intrinsic viscosity of about 0.077 dl/g. Yet another starch graft copolymer useful in embodiments herein is PenCP® 318 (Penford Products Company, Cedar Rapids, Iowa). One skilled in the art would recognize that any natural polymer/latex copolymer may be useful in embodiments herein.

Suitable natural polymer to latex ratios for the natural polymer/latex copolymers of the present disclosure may range from about 98 weight percent natural polymer to 2 weight percent latex monomer to about 25 weight percent natural polymer to 75 weight percent latex monomer. In a particular embodiment, the ratio of natural polymer to latex may range from 70 weight percent natural polymer to 30 weight percent latex monomer to about 40 weight percent natural polymer to 60 weight percent latex monomer. However, one skilled in the art would appreciate that other ranges may be used as well.

In embodiments where the latex monomer is itself a copolymer, for example, where styrene/butadiene is the latex monomer, suitable monomer ratios in a styrene/butadiene copolymer may range from about 70 parts by weight of styrene and 30 parts by weight of butadiene to about 30 parts by weight of styrene and 70 parts by weight of butadiene. For example, Penflex™ is characterized by a latex to starch ratio of 42 parts latex to 58 parts starch by weight with the latex having a butadiene to styrene ratio of 42 parts butadiene to 58 parts styrene by weight. In particular embodiments, styrene/butadiene copolymers may generally comprise higher ratios of butadiene to styrene due to the lesser cost of butadiene.

In applications where natural polymer/latex copolymers are added to wellbore fluids to reduce wellbore fluid and filtrate loss downhole, the wellbore fluid may be prepared in a wide variety of formulations. Specific formulations may depend on the stage of drilling at a particular time, for example, depending on the depth and/or the composition of the earthen formation. The amount of natural polymer/latex copolymer in the wellbore fluid may be varied depending on the desired application. In one embodiment, the natural polymer/latex copolymer may range from about 0.1 to about 20.0 wt % of the total weight of the wellbore fluid. In another embodiment, natural polymer/latex copolymer may range from about 0.2 to 10.0 wt % of the total weight of the wellbore fluid, and from about 0.3 to 5.0 wt % in yet another embodiment.

The wellbore fluids of the present disclosure may have an aqueous fluid as the base fluid. The aqueous fluid may include at least one of fresh water, sea water, brine, mixtures of water and water-soluble organic compounds and mixtures thereof. For example, the aqueous fluid may be formulated with mixtures of desired salts in fresh water. Such salts may include, but are not limited to alkali metal chlorides, hydroxides, or carboxylates, for example. In various embodiments of the drilling fluid disclosed herein, the brine may include seawater, aqueous solutions wherein the salt concentration is less than that of sea water, or aqueous solutions wherein the salt concentration is greater than that of sea water. Salts that may be found in seawater include, but are not limited to, sodium, calcium, aluminum, magnesium, potassium, strontium, and lithium salts of chlorides, bromides, carbonates, iodides, chlorates, bromates, formates, nitrates, oxides, sulfates, silicates, phosphates and fluorides. Salts that may be incorporated in a brine include any one or more of those present in natural seawater or any other organic or inorganic dissolved salts. Additionally, brines that may be used in the drilling fluids disclosed herein may be natural or synthetic, with synthetic brines tending to be much simpler in constitution. In one embodiment, the density of the drilling fluid may be controlled by increasing the salt concentration in the brine (up to saturation). In a particular embodiment, a brine may include halide or carboxylate salts of mono- or divalent cations of metals, such as cesium, potassium, calcium, zinc, and/or sodium.

For example, the solution may include zinc halides, such as zinc bromide or zinc chloride or both, and/or calcium halides, such as calcium bromide or calcium chloride or both. Alternatively, formate-based or acetate-based brines may be used. The brine solution may include the salts in conventional amounts, generally ranging from about 1% to about 80%, and preferably from about 20% to about 60%, based on the total weight of the solution, although as the skilled artisan will appreciate, amounts outside of this range can be used as well.

Further, embodiments of the present invention may further use "specialty" brines that include at least one alkali metal salt of a transition metal oxy-anion or polyoxy-anion, such as, for example, an alkali metal polytungstate, an alkali metal heteropolytungstate, an alkali metal polymolybdate or an alkali metal heteropolymolybdate. Specifically, these specialty brine solutions (which are typically used in high temperature applications) comprise aqueous solutions of transition metal salts, wherein the aqueous solution contains anionic moieties having the formula $[A^{n+}B_mO_k]^{x-}$, where (A) is selected from group IV elements, group V elements, transition metal elements, and rare earth elements; (B) is one or more transition metal elements having an atomic weight between 50 and 201 inclusive, O is oxygen, m is an integer between 6 and 18 inclusive, k is an integer between 24 and 62 inclusive, and x is a small integer, typically between 1 and 10 depending on the selections of A, B, m, and k, and where the cations may be lithium, sodium, potassium, cesium, or a mixture thereof, or with a small amount of hydrogen cations provided by free acid anionic moieties, and especially where said salts are a major component of the solution and not merely an additive thereto. In particular embodiments of the present invention may use, the sodium, potassium, and cesium salts of the heteropolytungstates and the blends of these salts with the heteropolytungstic acids. Specific examples of such brines may be found in PCT International Publication No. WO2007/005499, which is assigned to the present assignee and incorporated by reference herein in its entirety.

The wellbore fluids described above may be adapted to provide improved wellbore fluids under conditions of high temperature and pressure, such as those encountered in deep wells. Further, one skilled in the art would recognize that in addition to natural polymer/latex copolymers, other additives may be included in the wellbore fluids disclosed herein, for instance, weighting agents, viscosifiers, wetting agents, corrosion inhibitors, oxygen scavengers, anti-oxidants and free radical scavengers, biocides, surfactants, dispersants, interfacial tension reducers, pH buffers, mutual solvents and thinning agents.

A wellbore fluid according to the invention may be used in a method for drilling a well into a subterranean formation in a manner similar to those wherein conventional wellbore fluids are used. In the process of drilling the well, a wellbore fluid is circulated through the drill pipe, through the bit, and up the annular space between the pipe and the formation or steel casing to the surface. The wellbore fluid performs several different functions, such as cooling the bit, removing drilled cuttings from the bottom of the hole, suspending the cuttings and weighting material when the circulation is interrupted. In addition, the wellbore fluids of the present disclosure may provide filtration control to prevent excessive loss of wellbore fluids into the formation. The term "filtration control," as used herein, refers to any reduction of fluid loss into the formation achieved by use of the wellbore fluids of the present disclosure. Thus, in some embodiments, a wellbore having a copolymer of the present disclosure may provide filtration control at temperatures greater than about 300° F. In alternative embodiments, filtration control may be achieved at temperatures greater than about 350° F. or 400° F.

The natural polymer/latex copolymers may be added to the base fluid on location at the well-site where it is to be used, or it can be carried out from another location than the well-site. If the well-site location is selected for carrying out this step, then the natural polymer/latex copolymers may immediately be dispersed in an aqueous fluid, and the resulting wellbore fluid may immediately be emplaced in the well using techniques known in the art.

Wellbore fluids of the present disclosure containing natural polymer/latex copolymers may be emplaced into the wellbore using conventional techniques known in the art. The natural polymer/latex copolymers may be added to the drilling, completion, or workover fluid. In some embodiments, if sealing of a particular interval of the wellbore is needed, a solution of natural polymer/latex copolymers may be injected to such an interval, in addition to other intervals such as in a pill. The wellbore fluids described herein may be used in conjunction with any drilling or completion operation.

In particular, the natural polymer/latex copolymers of the present disclosure may be injected into a work string, flow to bottom of the wellbore, and then out of the work string and into the annulus between the work string and the casing or wellbore. This batch of treatment is typically referred to as a "pill." The pill may be pushed by injection of other wellbore fluids such as completion fluids behind the pill to a position within the wellbore which is immediately above a portion of the formation where fluid loss is suspected. Injection of fluids into the wellbore is then stopped, and fluid loss will then move the pill toward the fluid loss location.

Positioning the pill in a manner such as this is often referred to as "spotting" the pill. Injection of such pills is often through coiled tubing or by a process known as "bullheading."

Upon introducing a wellbore fluid of the present disclosure into a borehole, a filtercake may be formed which provides an effective sealing layer on the walls of the borehole preventing undesired invasion of fluid into the formation through which the borehole is drilled. Filtercakes formed from wellbore fluids disclosed herein include copolymers of natural polymers and latex polymers and may have unexpected properties. Such properties may include increased pressure blockage, reliability of blockage, and increased range of formation pore size that can be blocked. These filtercakes may provide filtration control across temperature ranges up to greater than 400° F.

Where the formation is a low permeability formation such as shales or clays, the filtercakes formed using the wellbore fluids and methods of the present disclosure prevent wellbore fluid and filtrate loss by effectively blocking at least some of the pores of the low permeation formation. This may allow for support of the formation by maintaining sufficient pressure differential between the wellbore fluid column and the pores of the wellbore. Further, the filtercakes formed by wellbore fluids of the present disclosure may effectively seal earthen formations. These filtercakes are stable at elevated temperatures, and may also effectively seal low permeability formations.

Before taking the well into production, filtercake in the producing region may be removed, such as by using a variety of techniques known in the art. For example, filtercakes according to present disclosure may be removed using a breaker fluid comprising an acidic aqueous solution. Examples of acids that may be used include strong mineral acids, such as hydrochloric acid or sulfuric acid, and organic acids, such as citric acid, lactic acid, malic acid, acetic acid, and formic acid. The breaker fluid may have a pH below 4, or below 3 in another embodiment. In other embodiments, the filter cake may be removed using a breaker liquid comprising a natural polymer degrading enzyme, for example, a carbohydrase. Examples of such enzymes include amylases, pullulanases, and cellulases. In yet other embodiments, the filtercake may be removed using a washing liquid comprising an oxidizing agent, such as sodium hypochlorite.

Example

An exemplary wellbore fluid was prepared as shown in Table 1 below.

TABLE 1

Wellbore Fluid Preparation

| COMPONENT | UNITS | EXAMPLE 1 |
| --- | --- | --- |
| Fresh Water | ml | 267.0 |
| Sodium Chloride | g | 60.0 |
| DUOVIS | g | 1.0 |
| UNITROL | g | 2.5 |
| EMI-1037 | ml | 10.0 |
| ULTRAHIB ™ | ml | 10.5 |
| ULTRACAP ™ | g | 2.0 |
| ULTRAFREE ™ | ml | 7.5 |
| Barite | g | 133.0 |
| OCMA clay | g | 10.0 |

The fluids used a variety of additives, all of which are commercially available from M-I LLC (Houston, Tex.). DUOVIS (a xanthan gum product) is used as a viscosifier in the formulations above. UNITROL is a modified polysaccharide used in filtration. EMI-1037 is a styrene-butadiene latex/corn starch copolymer. The ULTRAHIB™ additive is a liquid polyamine used as a shale inhibitor. The ULTRACAP™ additive is a low-molecular-weight, dry acrylamide copolymer designed to provide cuttings encapsulation and clay dispersion inhibition. ULTRAFREE™ anti-accretion additive designed to eliminate bit balling and enhance rate of penetration (ROP). OCMA clay, bentonitic clay having API/ISO specifications, was added to simulate drilling solids.

The wellbore fluid was then aged for 16 hours at 150° F. The rheology of the resulting wellbore fluid was measured using a Fann 35 viscometer. The rheological parameters are as shown in Table 2 below.

TABLE 2

Rheology of Wellbore Fluid

| RHEOLOGY at 70° F. | UNITS | EXAMPLE 1 |
| --- | --- | --- |
| 600 rpm | | 80 |
| 300 rpm | | 57 |
| 200 rpm | | 44 |
| 100 rpm | | 31 |
| 6 rpm | | 8 |
| 3 rpm | | 6 |
| Gels 10" | lbs/100 ft$^2$ | 8 |
| Gels 10' | lbs/100 ft$^2$ | 12 |
| Apparent viscosity | cP | 40 |
| Plastic viscosity | cP | 23 |
| Yield point | lbs/100 ft$^2$ | 34 |

Both API and HTHP Fluid loss were measured according to procedures outlined in API spec 13B. The fluid loss for the exemplary wellbore fluid is as shown in Table 3 below.

TABLE 3

Wellbore Fluid Loss

| FLUID LOSS PARAMETERS | UNITS | EXAMPLE 1 |
| --- | --- | --- |
| HTHP Fluid loss Temperature | ° F. | 200 |
| HTHP Fluid Loss Pressure | psi | 500 |
| HTHP Fluid Loss Volume | ml | 12 |
| pH | | 9.2 |
| API Fluid Loss Volume | ml | 1.9 |

Example 2

An exemplary high temperature high pressure wellbore fluid was prepared as shown in Table 4 below.

TABLE 4

Wellbore Fluid Preparation

| COMPONENT | UNITS | EXAMPLE 1 |
| --- | --- | --- |
| Fresh Water | ml | 207 |
| M-I GEL ™ SUPREME | g | 3.0 |
| Caustic Soda | g | 2.0 |
| RESINEX ® | g | 3.0 |
| EMI-927 | g | 2.0 |

TABLE 4-continued

Wellbore Fluid Preparation

| COMPONENT | UNITS | EXAMPLE 1 |
|---|---|---|
| EMI-1745 | g | 12.0 |
| EMI-1048 | ml | 2.0 |
| TANNATHIN ® | g | 3.0 |
| EMI-1037 | ml | 10.0 |
| Barite | g | 501 |

The fluids used a variety of additives, all of which are commercially available from M-I LLC (Houston, Tex.). M-I GEL™ SUPREME (an untreated benotonite clay) is used as a viscosifier in the formulations above. EMI-927 is a synthetic terpolymer used in controlling high temperature rheology. EMI-1037 is a styrene-butadiene latex/corn starch copolymer. The EMI-1745 additive is a lignin blend used as viscosity modifier. TANNATHIN™ is a natural lignite designed to provide secondary filtration control. RES-INEX® is a lignitic resin material designed to enhance high temperature/high pressure filtration. EMI-1048 is a synthetic polymer designed to minimize effects of solids on rheology.

The wellbore fluid was then aged for 16 hours at 400° F. The rheology of the resulting wellbore fluid was measured using a Fann 35 viscometer. The rheological parameters are as shown in Table 5 below.

TABLE 5

Rheology of Wellbore Fluid

| RHEOLOGY at 120° F. | UNITS | EXAMPLE 1 |
|---|---|---|
| 600 rpm | | 86 |
| 300 rpm | | 48 |
| 200 rpm | | 37 |
| 100 rpm | | 22 |
| 6 rpm | | 6 |
| 3 rpm | | 6 |
| Gels 10" | lbs/100 ft$^2$ | 9 |
| Gels 10' | lbs/100 ft$^2$ | 26 |
| Apparent viscosity | cP | 43 |
| Plastic viscosity | cP | 38 |
| Yield point | lbs/100 ft$^2$ | 10 |

Both API and HTHP Fluid loss were measured according to procedures outlined in API spec 13B. The fluid loss for the exemplary wellbore fluid is as shown in Table 6 below.

TABLE 6

Wellbore Fluid Loss

| FLUID LOSS PARAMETERS | UNITS | EXAMPLE 1 |
|---|---|---|
| HTHP Fluid loss Temperature | ° F. | 350 |
| HTHP Fluid Loss Pressure | psi | 500 |
| HTHP Fluid Loss Volume | ml | 15.6 |
| pH | | 7.8 |
| API Fluid Loss Volume | ml | 3.2 |

Advantageously, embodiments of the present disclosure provide wellbore fluids and methods of drilling with such fluids that include a natural polymer/latex copolymer. Use of wellbore fluids containing a natural polymer/latex copolymer may prevent wellbore fluid loss into the formation. Further, in addition being able to build up a filtercake to control filtration loss into a permeable formation, the copolymers may also advantageously assist in forming a seal on low permeation formations such as clays and shales, which is not typically achievable using conventional fluid loss control agents. Further, when using conventional latex polymers to seal a low permeability formation, the seal is achieved through the formation of a precipitated film on the formation; however, such precipitated film may have deleterious effects on the formation. By using the fluids and copolymers of the present disclosure, such sealing effect may be achieved without initiating precipitation. Additionally, the copolymers contained within wellbore fluids of the present disclosure may also advantageously be stable and prevent wellbore fluid loss up to and over temperatures of 400° F., whereas use of conventional fluid loss control additives or latex additives may begin to experience degradation at lower temperatures.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed:

1. A method for drilling a wellbore comprising:
introducing an aqueous based wellbore fluid into the wellbore;
circulating the aqueous based wellbore fluid while drilling,
wherein the aqueous based wellbore fluid comprises a copolymer of a natural polymer and a latex monomer;
wherein the natural polymer is at least one of polysaccharides or tannins and mixtures and derivatives thereof; and
wherein the latex monomer comprises at least one selected from the group consisting of styrene, butadiene, isoprene, vinyl acetate, vinyl esters of fatty acids, vinyl chloride, vinylidene chloride, tetrafluoroethylene, and polymers or copolymers thereof; and
allowing the copolymer to form at least part of a filtercake on the wellbore walls.

2. The method of claim 1, wherein the copolymer is added as a polymer solution or a polymer suspension to the wellbore fluid.

3. The method of claim 1, wherein the natural polymer is at least one of tannins, starch, glycogen, cellulose, locust bean gums, xanthan gums, wellan gums, scleroglucan gums, guar gums, and mixtures and derivatives thereof.

4. The method of claim 3, wherein the natural polymer is at least one of corn starch, cellulose, potato starch, tapioca starch, wheat starch and rice starch.

5. The method of claim 1, wherein the copolymer provides an effective filtration control at downhole temperatures greater than 300° F.

6. The method of claim 5, wherein the copolymer provides an effective filtration control at downhole temperatures greater than 350° F.

7. The method of claim 6, wherein the copolymer provides an effective filtration control at downhole temperatures greater than 400° F.

8. The method of claim 1, further comprising at least one weighting agent.

9. The method of claim 1, wherein the copolymer is incorporated into the wellbore fluid in an amount up to 20 weight percent.

10. The method of claim 1, wherein the aqueous based wellbore fluid further comprises at least one of viscosifiers, wetting agents, corrosion inhibitors, oxygen scavengers, anti-oxidants and free radical scavengers, biocides, surfactants, dispersants, interfacial tension reducers, pH buffers, mutual solvents or thinning agents.

11. The method of claim 1, further comprising:
removing the filtercake from the wellbore walls by
emplacing a breaker fluid into the wellbore to allow the breaker fluid to contact the filtercake comprising the copolymer.

\* \* \* \* \*